US007889526B2

(12) United States Patent  (10) Patent No.: US 7,889,526 B2
Baby  (45) Date of Patent: Feb. 15, 2011

(54) CAT-EAR POWER SUPPLY HAVING A LATCH RESET CIRCUIT

(75) Inventor: Cyril Baby, Conshohocken, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 463 days.

(21) Appl. No.: 12/114,469

(22) Filed: May 2, 2008

(65) Prior Publication Data

US 2009/0273958 A1    Nov. 5, 2009

(51) Int. Cl.
*H02M 5/42* (2006.01)
*G05F 5/00* (2006.01)

(52) U.S. Cl. .......................... 363/89; 323/288; 323/299
(58) Field of Classification Search ................... 363/52, 363/53, 84, 89; 323/242, 284, 285, 288, 323/299; 315/224, 291
See application file for complete search history.

(56) References Cited

U.S. PATENT DOCUMENTS

| | | | |
|---|---|---|---|
| 4,439,688 A | 3/1984 | Schornack | |
| 4,689,547 A | 8/1987 | Rowen et al. | |
| 4,745,351 A | 5/1988 | Rowen et al. | |
| 5,017,837 A | 5/1991 | Hanna et al. | |
| 5,248,919 A | 9/1993 | Hanna et al. | |
| 5,430,637 A * | 7/1995 | Buck | 363/89 |
| 6,674,248 B2 | 1/2004 | Newman, Jr. et al. | |
| 6,778,416 B2 * | 8/2004 | Bruno | 363/89 |
| 6,969,959 B2 | 11/2005 | Black et al. | |
| 6,980,122 B2 | 12/2005 | Novikov | |
| 6,987,449 B2 | 1/2006 | Novikov | |
| 7,005,762 B2 | 2/2006 | Black et al. | |
| 7,012,518 B2 | 3/2006 | Novikov | |
| 7,091,672 B2 | 8/2006 | Steffie et al. | |
| 7,190,124 B2 | 3/2007 | Kumar et al. | |

(Continued)

FOREIGN PATENT DOCUMENTS

WO   WO 2007/005651 A   1/2007

OTHER PUBLICATIONS

European Patent Office, International Search Report and Written Opinion for International Patent Application No. PCT/US2009/042092, Aug. 13, 2009, 13 pages.

*Primary Examiner*—Jessica Han
(74) *Attorney, Agent, or Firm*—Mark E. Rose; Philip N. Smith; Bridget L. McDonough

(57) ABSTRACT

A cat-ear power supply is operable to generate a DC voltage and draws current from an AC power source near the beginning and end of a half-cycle of the AC power source. A controllably conductive switching circuit selectively charges an energy storage capacitor to produce the DC voltage and become conductive to charge the energy storage capacitor near the beginning of the half-cycle of the AC power source. A latch circuit controls the controllably conductive switching circuit to become non-conductive in response to the magnitude of the DC voltage. A switch voltage monitor circuit controls the controllably conductive switching circuit to become non-conductive and resets the latch circuit when the magnitude of a switch voltage across the switching circuit exceeds a predetermined switch voltage threshold. The switching circuit becomes conductive to charge the energy storage capacitor near the end of the half-cycle when the magnitude of the switch voltage drops below the predetermined switch voltage threshold.

18 Claims, 4 Drawing Sheets

U.S. PATENT DOCUMENTS

| | | |
|---|---|---|
| 7,242,150 B2 | 7/2007 | DeJonge et al. |
| 7,285,919 B2 | 10/2007 | Newman, Jr. et al. |
| 7,342,764 B2 | 3/2008 | Black |
| 7,358,627 B2 | 4/2008 | Black et al. |
| 7,423,413 B2 | 9/2008 | Dobbins et al. |
| 7,432,661 B2 | 10/2008 | Taipale et al. |
| 7,446,486 B2 | 11/2008 | Steffie et al. |
| 7,546,473 B2 * | 6/2009 | Newman .................... 713/300 |
| 2003/0107332 A1 | 6/2003 | Newman, Jr. et al. |
| 2005/0157441 A1 | 7/2005 | Black |
| 2006/0119187 A1 | 6/2006 | Newman, Jr. |
| 2007/0001654 A1 | 1/2007 | Newman, Jr. |
| 2007/0159153 A1 | 7/2007 | Fricke et al. |
| 2008/0094010 A1 | 4/2008 | Black |
| 2008/0258650 A1 | 10/2008 | Steiner et al. |
| 2009/0160409 A1 | 6/2009 | Carmen |

* cited by examiner ized U.S. Pat. No. 5,248,919, issued on Sep. 28, 1993, entitled LIGHTING CONTROL DEVICE, which is herein incorporated by reference in its entirety.

CAT-EAR POWER SUPPLY HAVING A LATCH RESET CIRCUIT

BACKGROUND OF THE INVENTION

1. Field of the Invention

The present invention relates to a power supply for a load control device, and more particularly, to a cat-ear power supply that is able to charge an energy storage capacitor from an alternating-current (AC) power source at the beginning and the end of each half-cycle of the AC power source.

2. Description of the Related Art

A conventional two-wire dimmer has two connections: a "hot" connection to an alternating-current (AC) power supply and a "dimmed hot" connection to the lighting load. Standard dimmers use one or more semiconductor switches, such as triacs or field effect transistors (FETs), to control the current delivered to the lighting load and thus to control the intensity of the lighting load. The semiconductor switches are typically coupled between the hot and dimmed hot connections of the dimmer.

Smart wall-mounted dimmers may include a user interface typically having a plurality of buttons for receiving inputs from a user and a plurality of status indicators for providing feedback to the user. These smart dimmers typically include a microprocessor or other processing device for allowing an advanced set of control features and feedback options to the end user. An example of a smart dimmer is disclosed in commonly assigned U.S. Pat. No. 5,248,919, issued on Sep. 28, 1993, entitled LIGHTING CONTROL DEVICE, which is herein incorporated by reference in its entirety.

In order to provide a direct-current (DC) voltage $V_{CC}$ to power the microprocessor and other low-voltage circuitry, the smart dimmers typically include cat-ear power supplies. A cat-ear power supply draws current only near the beginning and the end of a half-cycle of the AC source voltage and derives its name from the shape of the current waveform that it draws from the AC voltage source. Because the smart dimmer only has two terminals, the power supply must draw current through the connected lighting load. In order for the power supply to be able to draw sufficient current, the semiconductor switch must be non-conductive so that a sufficient voltage is available across the power supply. Thus, the semiconductor cannot be turned on for the entire length of a half-cycle, even when the maximum voltage across the lighting load is desired.

FIG. 1 is a simplified schematic diagram of a prior art cat-ear power supply 10. The power supply 10 comprises an energy storage capacitor C12 across which a DC supply voltage $V_C$ is produced. The power supply 10 also comprises a full-wave bridge rectifier BR14 that is coupled to an AC power source and produces a rectified voltage V+. The capacitor C12 is operable to charge through the rectifier BR14, a switching circuit 20, and a diode D16 to generate the supply voltage $V_C$.

The switching circuit 20 comprises a semiconductor switch (e.g., a FET Q22), having drain and source terminals coupled in series electrical connection between the rectifier BR14 and the capacitor C12. A gate of the FET Q22 is coupled to a drive source circuit 30 through resistors R24, R26, R28. The drive source circuit 30 generates a drive voltage, which is used to control the FET Q22 into the conductive state. To produce the drive voltage, a capacitor C32 charges from the rectified voltage V+ through a resistor R34 and a diode D36. During each half-cycle of the AC power source, the capacitor C32 begins to charge when the magnitude of the AC voltage exceeds the voltage across the series combination of the capacitor C32 and the capacitor C12. The voltage across the capacitor C32 is limited to approximately a breakover voltage of a zener diode Z38 (e.g., approximately 40V). When the voltage at the gate of the FET Q22 exceeds a predetermined gate voltage (e.g., approximately 15 volts), the FET is rendered conductive allowing the capacitor C12 to charge. A zener diode Z29 of the switching circuit 20 prevents the voltage at the gate of the FET Q22 from exceeding a predetermined safe operating voltage (e.g., 25 V) to protect the FET.

An overcurrent protection circuit 40 is coupled in series between the switching circuit 20 and the capacitor C12. A sense voltage generated across a sense resistor R42 is representative of the magnitude of the current through the capacitor C12. If the current through the sense resistor R42 exceeds a predetermined current limit, an NPN bipolar junction transistor Q44 is rendered conductive. Accordingly, the gate of the FET Q22 is pulled down towards circuit common, such that the FET is rendered non-conductive.

A turn-off circuit 50 is coupled to the junction of the resistors R26, R28 of the switching circuit 20 and is operable to render the FET Q22 non-conductive when either the magnitude of the voltage across the capacitor C12 reaches a predetermined peak supply voltage level or the magnitude of the AC line voltage exceeds a predetermined line voltage level. Specifically, the junction of the overcurrent protection circuit 40 and the diode D16 is coupled to the base of an NPN transistor Q52 through a resistor R62 and a zener diode Z64. When the magnitude of the voltage across the capacitor C12 and the diode D16 is such that the voltage across the zener diode Z64 is greater than the breakover voltage of the zener diode, the zener diode begins to conduct current into the base of the transistor Q52. Accordingly, the transistor Q52 is rendered conductive and the gate of the FET Q22 is pulled down towards circuit common, thus, rendering the FET non-conductive. The base of the transistor Q52 is also coupled to a line voltage detect circuit 70, which comprises a voltage divider having two resistor R72, R74. When the magnitude of the AC line voltage exceeds the predetermine line voltage level, the transistor Q52 is rendered conductive, the drain-source impedance of the FET Q22 increases, and the magnitude of the current through the capacitor C12 is limited.

After the transistor Q52 is rendered conductive during a half-cycle of the AC power source, a latch circuit 80 prevents the FET Q22 from being rendered conductive until near the end of the present half-cycle. The latch circuit 80 comprises a PNP transistor Q82 having a base coupled to the collector of the transistor Q52 through a resistor R84. When the transistor Q52 becomes conductive, the base of the transistor Q82 is pulled down towards circuit common and the transistor Q82 is rendered conductive. Accordingly, the transistor Q82 conducts current through a resistor R86 and into the base of the transistor Q52 to maintain the transistor Q52 conductive until the end of the half-cycle.

Thus, the capacitor C12 is limited to charging only at the beginning of each half-cycle. There is a need for a power supply that charges at the beginning of each half-cycle, and latches off to prevent the energy storage capacitor from charging near the peak of the AC line voltage, but also allows the energy storage capacitor to charge before the end of the half-cycle when the magnitude of the AC line voltage is below a predetermined magnitude.

SUMMARY OF THE INVENTION

According to an embodiment of the present invention, a cat-ear power supply for a load control device, which controls the amount of power delivered to an electrical load from an AC power source, is operable to generate a DC voltage and draw current from the AC power source near the beginning and the end of a half-cycle of the AC power source. The power supply comprises an energy storage capacitor, a controllably conductive switching circuit, a latch circuit, and a switch voltage monitor circuit. The controllably conductive switching circuit is coupled in series electrical connection with the energy storage capacitor for selectively charging the energy storage capacitor to produce the DC voltage. The controllably conductive switching circuit is operable to become conductive to charge the energy storage capacitor near the beginning of the half-cycle of the AC power source. A switch voltage is produced across the controllably conductive switching circuit and is representative of a magnitude of an AC line voltage of the AC power source. The latch circuit is coupled to the controllably conductive switching circuit, wherein the latch circuit controls the controllably conductive switching circuit to become non-conductive in response to the magnitude of the DC voltage. The switch voltage monitor circuit is coupled to the controllably conductive switching circuit and to the latch circuit, such that the switch voltage monitor circuit controls the controllably conductive switching circuit to become non-conductive, and also resets the latch circuit when the magnitude of the switch voltage exceeds a predetermined switch voltage threshold. The controllably conductive switching circuit is operable to become conductive to charge the energy storage capacitor near the end of the half-cycle when the magnitude of the switch voltage drops below the predetermined switch voltage threshold.

According to another embodiment of the present invention, a power supply for generating a DC voltage in a load control device for controlling the amount of power delivered to an electrical load from an AC power source, comprises: (1) an energy storage capacitor; (2) a controllably conductive switching circuit coupled in series electrical connection with the energy storage capacitor for selectively charging the energy storage capacitor to produce the DC voltage, the controllably conductive switching circuit operable to become conductive to charge the energy storage capacitor near the beginning of a half-cycle of the AC power source; (3) a latch circuit coupled to the controllably conductive switching circuit, wherein the latch circuit controls the controllably conductive switching circuit to become non-conductive in response to the magnitude of the DC voltage; and (4) a switch voltage monitor circuit coupled to the controllably conductive switching circuit, such that the switch voltage monitor circuit controls the controllably conductive switching circuit to become non-conductive when the magnitude of the AC line voltage exceeds a predetermined line voltage threshold; characterized in that the switch voltage monitor circuit is further coupled to the latch circuit such that the latch circuit is reset when the magnitude of the AC line voltage exceeds the predetermined line voltage threshold, and the controllably conductive switching circuit is operable to become conductive to charge the energy storage capacitor near the end of the half-cycle when the magnitude of the AC line voltage drops below the predetermined line voltage threshold.

A load control device for controlling an amount of power delivered to an electrical load from an AC power source is also described herein. The load control device comprises a controllably conductive device, a controller, and a cat-ear power supply operable to generate a DC voltage and draw current from the AC power source near the beginning and the end of a half-cycle of the AC power source. The controllably conductive device is adapted to be coupled in series electrical connection between the source and the load and has a control input for controlling the controllably conductive device between a non-conductive state and a conductive state. The controller is operatively coupled to the control input of the controllably conductive device for controlling the semiconductor switch between the non-conductive state and the conductive state. The cat-ear power supply comprises a controllably conductive switching circuit for selectively charging an energy storage capacitor to produce the DC voltage. The controllably conductive switching circuit is operable to become conductive to charge the energy storage capacitor near the beginning of a half-cycle of the AC power source. The power supply further comprises a latch circuit for controlling the controllably conductive switching circuit to become non-conductive in response to the magnitude of the DC voltage. The switch voltage monitor circuit controls the controllably conductive switching circuit to become non-conductive and resets the latch circuit when the magnitude of a switch voltage across the controllably conductive device exceeds a predetermined switch voltage threshold. The controllably conductive switching circuit is operable to become conductive to charge the energy storage capacitor near the end of the half-cycle when the magnitude of the switch voltage drops below the predetermined switch voltage threshold.

Other features and advantages of the present invention will become apparent from the following description of the invention that refers to the accompanying drawings.

BRIEF DESCRIPTION OF THE DRAWINGS

For the purpose of illustrating the invention, there is shown in the drawings a form, which is presently preferred, it being understood, however, that the invention is not limited to the precise arrangements and instrumentalities shown. The features and advantages of the present invention will become apparent from the following description of the invention that refers to the accompanying drawings, in which.

DETAILED DESCRIPTION OF EMBODIMENTS OF THE INVENTION

Figure 1:
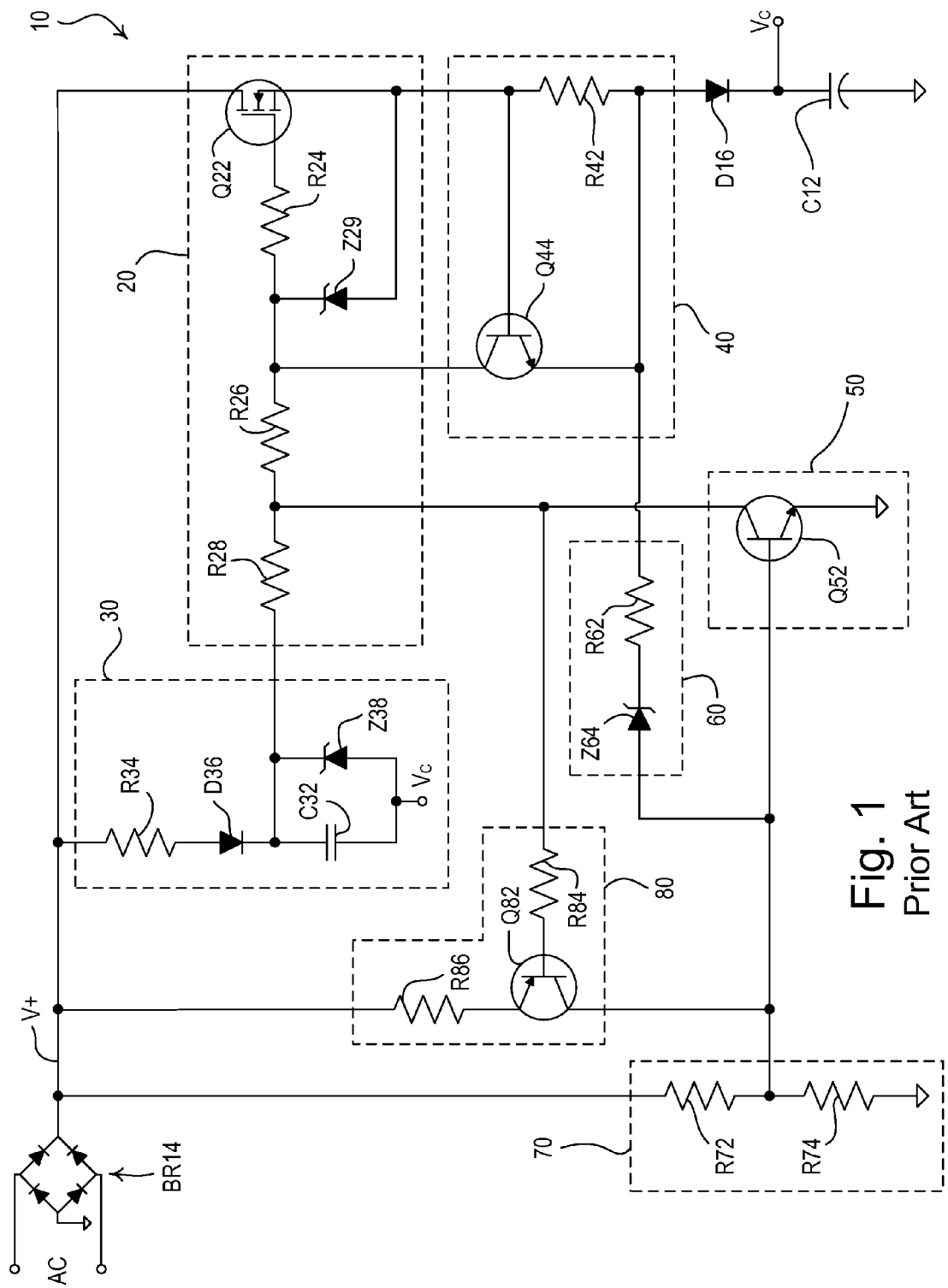
FIG. 1 is a simplified schematic diagram of a prior art cat-ear power supply.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 2:
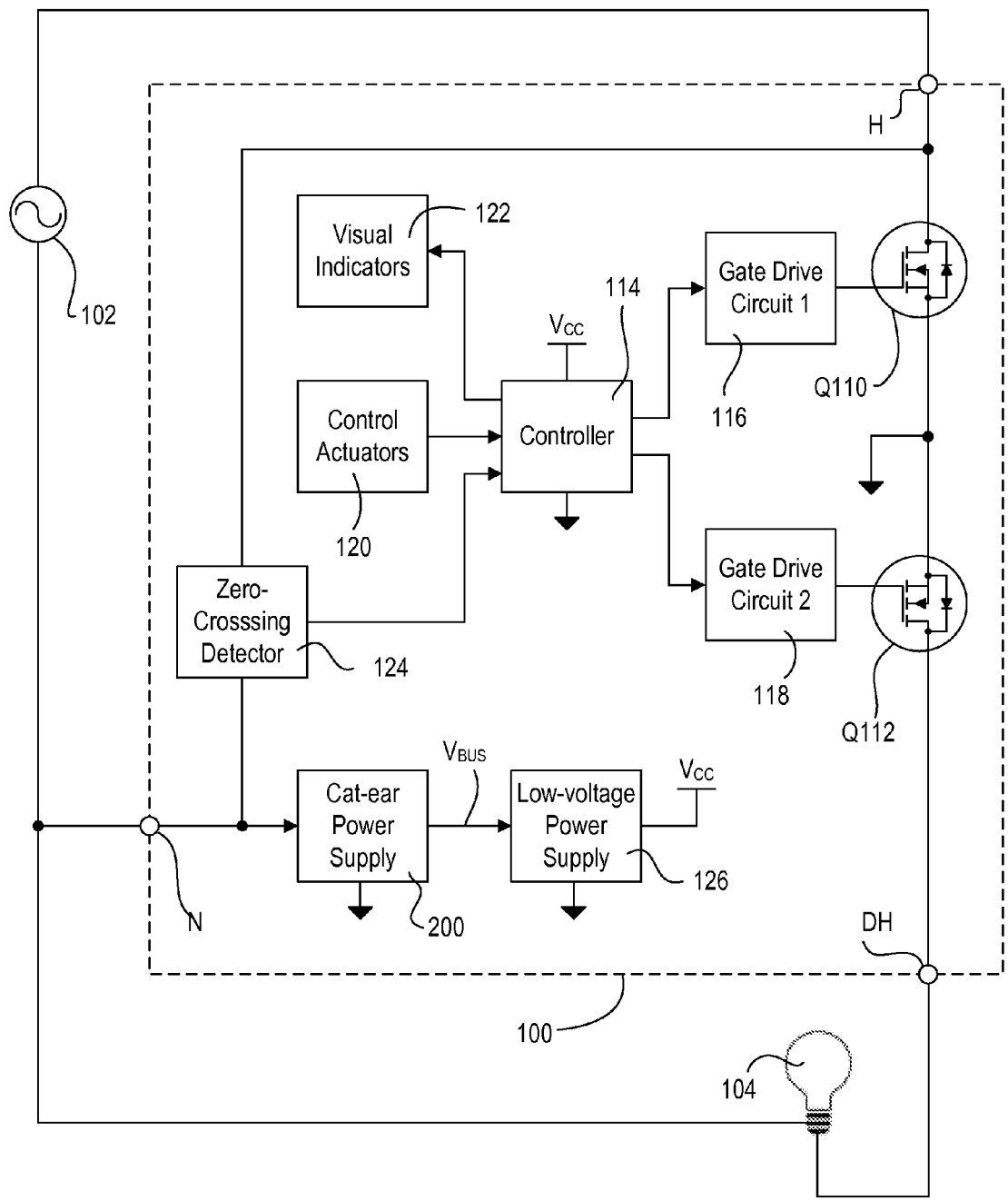
FIG. 2 is a simplified block diagram of a dimmer switch having a cat-ear power supply according to an embodiment of the present invention.

FIG. 2 is a simplified block diagram of a load control device, e.g., a dimmer switch 100, having a cat-ear power supply 200 according to an embodiment of the present invention. The dimmer switch 100 is coupled in series electrical connection between an AC power source 102 (e.g., 120 VAC @ 60 Hz) and an electrical load (e.g., a lighting load 104), such that the dimmer switch receives an AC line voltage $V_{AC}$ from the AC power source and controls of the amount of power delivered to the lighting load. The dimmer switch 100 comprises a hot terminal H coupled to the hot side of the AC power source 102 and a dimmed-hot terminal DH coupled to the lighting load 104. The dimmer switch 100 further comprises a neutral terminal N coupled to the neutral side of the AC power source 102.

The dimmer switch 100 comprises a controllably conductive device, e.g., two FETs Q110, Q112 coupled in anti-series connection, for control of the amount of power delivered to the lighting load 104, and thus, the intensity of the lighting load. Alternatively, the controllably conductive device could be implemented as any suitable type of bidirectional semiconductor switch, such as, for example, a triac, two silicon-controller rectifiers (SCRs) in anti-parallel connection, or a FET in a rectifier bridge. As shown in FIG. 2, the FETs Q110, Q112 are coupled in series between hot terminal H and the dimmed-hot terminal DH, such that the FETs are adapted to be coupled between the source 102 and the load 104. The junction of the FETs Q110, Q112 is coupled to a circuit common. The FETs Q110, Q112 may both comprise, for example, part number FDPF2710T, manufactured by Fairchild Semiconductors.

A controller 114 is coupled to control inputs (i.e., gates) of the FETs Q110, Q112 via first and second gate drive circuits 116, 118, respectively. The inputs provided to the gates cause the FETs Q110, Q112 to be rendered conductive or non-conductive, which in turn controls the power provided to the lighting load 104. To conduct load current from the AC power source 102 to the lighting load 104, the controller 114 renders both FETs Q110, Q112 conductive. During the positive half-cycles, the controller 114 renders the first FET Q110 non-conductive to stop the conduction of (i.e., block) the load current. During the negative half-cycles, the controller 114 renders the second FET Q112 non-conductive to block the load current. The controller 114 may be implemented as a microcontroller, a microprocessor, a programmable logic device (PLD), an application specific integrated circuit (ASIC), a field-programmable gate array (FPGA), or any suitable processing device.

The controller 114 receives inputs from one or more control actuators 120, which may comprise, for example, a toggle actuator and an intensity adjustment actuator. The controller 114 is operable to control the intensity of the lighting load 104 to a desired lighting intensity in response to the inputs received from the control actuators 120. The controller 114 is further operable to illuminate one or more visual indicators 122, e.g., light-emitting diodes (LEDs), to display feedback to a user. For example, the visual indicators 122 may be illuminated to display a representation of the amount of power presently being delivered to the lighting load 104.

A zero-crossing detector 124 is coupled between the hot terminal H and the neutral terminal N and determines the zero-crossings of the input AC waveform from the AC power supply 102. A zero-crossing is defined as the time at which the AC supply voltage transitions from positive to negative polarity, or from negative to positive polarity, at the beginning of each half-cycle. The controller 114 provides the control inputs to the drive circuits 116, 118 to operate the FETs Q110, Q112 at predetermined times relative to the zero-crossing points of the AC waveform.

The controller 114 may use forward-phase control or reverse phase-control dimming techniques for control of the power delivered to the lighting load 104. With forward phase control dimming, the FETs Q110, Q112 are rendered conductive at a specific time each half-cycle in response to the desired intensity of the lighting load 104, and the FETs Q110, Q112 are maintained conductive until the next voltage zero-crossing. The forward phase control dimming technique is often used to control energy to a resistive or inductive load, which may include, for example, an incandescent lamp or a magnetic low-voltage transformer. In reverse phase control dimming, the FETs Q110, Q112 are controlled to be conductive immediately following a zero-crossing of the AC line voltage $V_{AC}$ and then rendered non-conductive at a specific time later in the half-cycle depending upon the desired intensity of the lighting load 104. The reverse phase control dimming technique is often used to control energy to a capacitive load, which may include, for example, an electronic low-voltage transformer.

The cat-ear power supply 200 is coupled between the neutral terminal N and circuit common and generates a DC bus voltage $V_{BUS}$ (e.g., approximately 80 V). The cat-ear power supply 200 is operable to draw a charging current $I_{CHRG}$ from the AC power source 102 through the neutral terminal N and the body diode of the first FET Q110 during the negative half-cycles. The bus voltage $V_{BUS}$ is received by a second-stage low-voltage power supply 126 that generates a low-voltage DC supply voltage $V_{CC}$ (e.g., 5 V) for powering the controller 114 and other low voltage circuitry of the dimmer switch 100.

Figure 3:
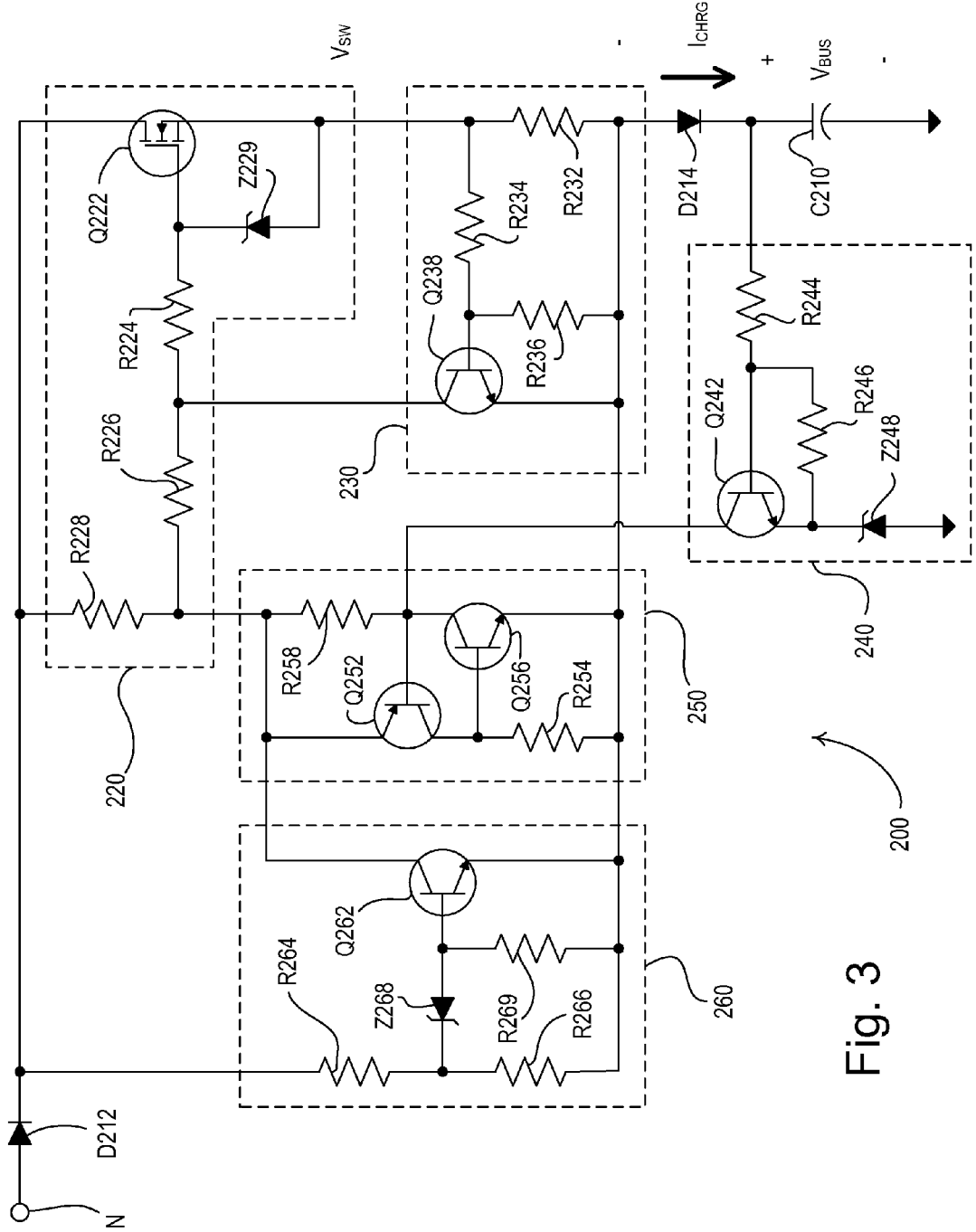
FIG. 3 is a simplified schematic diagram of the cat-ear power supply of FIG. 2.
Figure 4:
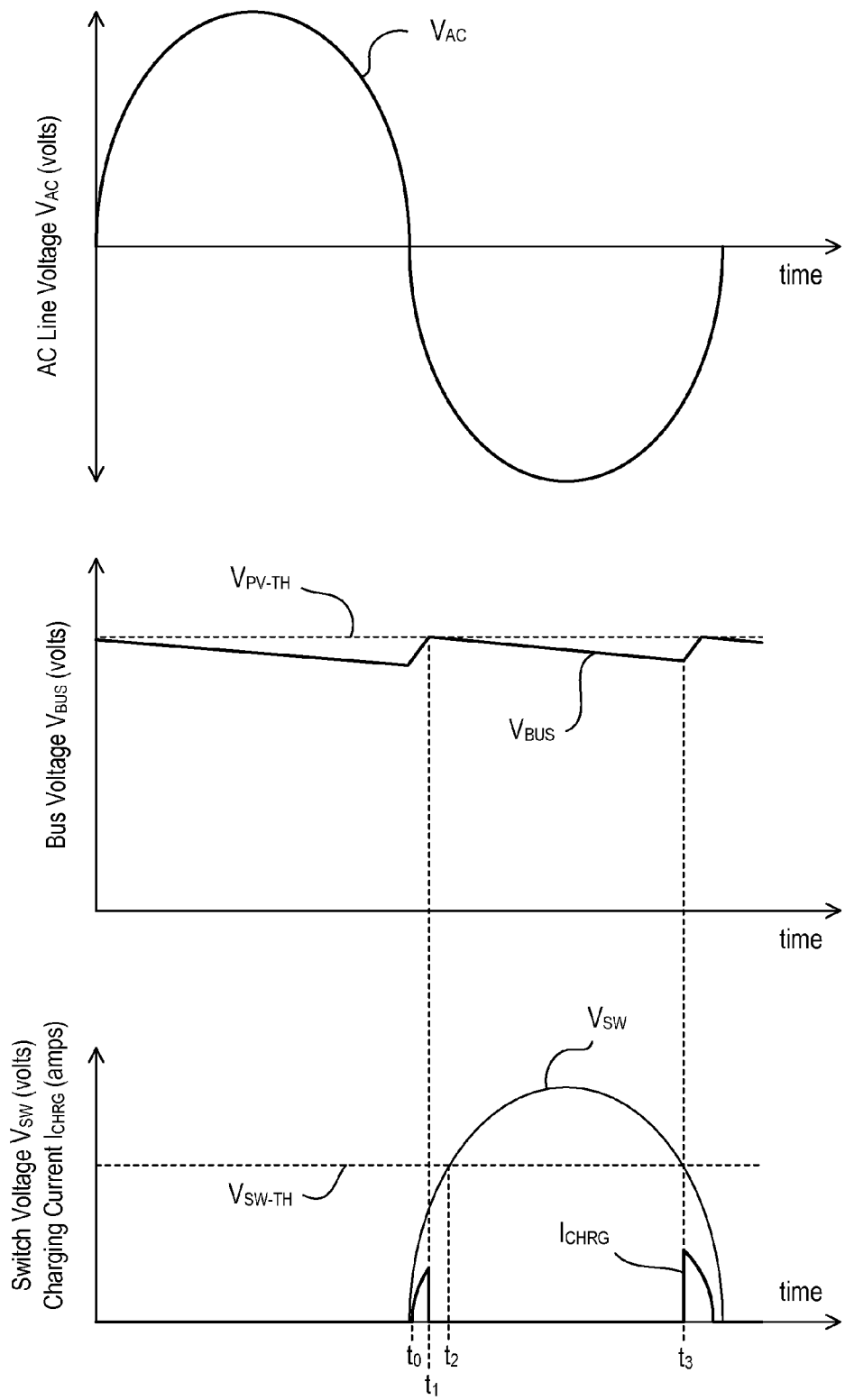
FIG. 4 is a simplified diagram of waveforms that demonstrate the operation of the power supply of FIG. 3.

FIG. 3 is a simplified schematic diagram of the cat-ear power supply 200. FIG. 4 is a simplified diagram of waveforms that demonstrate the operation of the power supply 200. The power supply 200 comprises an energy storage capacitor C210, which is operable to conduct the charging current $I_{CHRG}$ from the neutral terminal N through a first diode D212, a controllably conductive switching circuit 220, a second diode D214, and the energy storage capacitor C210. The bus voltage $V_{BUS}$ is generated across the energy storage capacitor C210. The switching circuit 220 comprises a FET Q222 coupled in series electrical connection with the energy storage capacitor C210 for selectively charging the energy storage capacitor to produce the bus voltage $V_{BUS}$. The gate of the FET Q222 is coupled to the neutral terminal N through the first diode D212 and three resistors R224, R226, R228, which have, for example, resistances of 10Ω, 15 kΩ, and 100 kΩ, respectively. Shortly after the beginning of each half-cycle (e.g., at time $t_0$ in FIG. 4), the FET Q222 is rendered conductive, the charging current $I_{CHRG}$ begins to flow, and the capacitor C210 begins to charge when an appropriate gate voltage (e.g., 3 V) is provided at the gate of the FET Q222. A zener diode Z229 is coupled to the gate of the FET Q222 to prevent the gate voltage from exceeding a predetermined maximum gate voltage (e.g., 12 V) and damaging the FET. The FET Q222 may comprise, for example, part number STN1NK60, manufactured by ST Microelectronics.

An overcurrent protection circuit 230 is coupled in series with the FET Q222 and the energy storage capacitor C210. A sense voltage generated across a sense resistor R232 (which has, for example, a resistance of 1 Ω) is representative of the magnitude of the current through the energy storage capacitor C210. A resistive divider (having resistors R234, R236) is coupled across the sense resistor R232. The junction of the two resistors R234, R236 is coupled to the base of an NPN bipolar junction transistor Q238. For example, the resistors R234, R236 may have resistances of 2.2 kΩ and 69.2 kΩ, respectively, such that the transistor Q238 is rendered conductive when the current through the sense resistor R232 exceeds a predetermined overcurrent threshold (e.g., 0.6 A). Accordingly, when the transistor Q238 is conductive, the magnitude of the voltage at the gate of the FET Q222 decreases and the drain-source impedance of the FET Q222 increases, thus limiting the magnitude of the charging current $I_{CHRG}$.

A voltage regulation circuit 240 is coupled across the energy storage capacitor C210 and is responsive to the magnitude of the bus voltage $V_{BUS}$. The voltage regulation circuit 240 is coupled to a latch circuit 250 and is operable to cause the latch circuit to control the controllably conductive switching circuit 220 to become non-conductive when the magnitude of the bus voltage $V_{BUS}$ exceeds a predetermined peak voltage threshold $V_{PV-TH}$ (e.g., at time $t_1$ in FIG. 4). The voltage regulation circuit 240 comprises a semiconductor switch (e.g., an NPN bipolar junction transistor Q242) and a resistive divider (having resistors R244, R246) coupled across the capacitor C210. The junction of the resistors R244, R246 is coupled to the base of the transistor Q242. The transistor Q238 of the overcurrent protection circuit 230 and the transistor Q242 of the voltage regulation circuit 240 may comprise a dual-transistor part, e.g., part number MMDT3904, manufactured by Diodes, Inc. The resistors R244, R246 may have resistances of, for example, 100 Ω and 56 kΩ, respectively.

A zener diode Z248 is coupled between the emitter of the transistor Q242 and circuit common and has, for example, a breakover voltage of approximately 91 V. When the magnitude of the bus voltage exceeds a predetermined peak voltage level (e.g., 91 V), the transistor Q242 is rendered conductive causing the latch circuit to control the controllably conductive switching circuit 220 to become non-conductive as will be described in greater detail below.

The latch circuit 250 comprises a first semiconductor switch (e.g., a PNP bipolar junction transistor Q252) coupled in series electrical connection with a first resistor R254 (e.g., having a resistance of 10 kΩ). The latch circuit 250 further comprises a second semiconductor switch (e.g. an NPN bipolar junction transistor Q256) coupled in series electrical connection with a second resistor R258 (e.g., having a resistance of 10 kΩ). The series combination of the first transistor Q252 and the first resistor R254 is coupled in parallel electrical connection with the series combination of the second transistor Q256 and the second resistor R258. The first transistor Q252 has a base coupled to the junction of the collector of the second transistor Q256 and the second resistor R258, while the second transistor Q256 has a base coupled to the junction of the collector of the first transistor Q252 and the first resistor R254. The base of the first transistor Q252 is further coupled to the collector of the transistor Q242 of the voltage regulation circuit 240. The first and second transistors Q252, Q256 may comprise a dual-transistor part, e.g., part number MMDT3946, manufactured by Diodes, Inc.

When the magnitude of the bus voltage $V_{BUS}$ exceeds the predetermined peak voltage threshold $V_{PV-TH}$ and the transistor Q242 of the voltage regulation circuit 240 is rendered conductive, the voltage across the latch circuit is reduced to and maintained at substantially zero volts, e.g., less than or equal to approximately 1.4 volts. Specifically, when the transistor Q242 is rendered conductive, a current is drawn through the second resistor R258 and the first transistor Q252 also becomes conductive. The first transistor Q252 then conducts a current through the first resistor R254 and the second transistor Q256 is rendered conductive, thus, latching the transistors Q252, Q256 both in the conductive state. When both of the transistors Q252, Q256 are conductive, the voltage across the latch circuit 250 is substantially zero volts and the voltage at the gate of the FET Q222 is reduced, thus, rendering the FET Q222 non-conductive. The FET Q222 is maintained non-conductive as long as the latch circuit 250 stays latched.

A switch voltage monitor circuit 260 is coupled to the controllably conductive switching circuit 220 and the latch circuit 250. The switch voltage monitor circuit 260 renders the FET Q222 non-conductive when the magnitude of a switch voltage $V_{SW}$ (across the controllably conductive switching circuit 220 and the overcurrent protection circuit 230) exceeds a predetermined switch voltage threshold $V_{SW-TH}$ (e.g., approximately 70 V). The magnitude of the switch voltage $V_{SW}$ is representative of the magnitude of the AC line voltage $V_{AC}$ during the negative half-cycles. Specifically, the magnitude of the switch voltage $V_{SW}$ is approximately equal to the magnitude of the AC line voltage $V_{AC}$ subtracted by the magnitude of the bus voltage $V_{BUS}$ and the forward voltage drops of the diode D212, the diode D214, and the body diode of the first FET Q110.

The switch voltage monitor circuit 260 maintains the FET Q222 in the non-conductive state as long as the magnitude of the switch voltage $V_{SW}$ is above the predetermined switch voltage threshold $V_{SW-TH}$. The switch voltage monitor circuit 260 further operates as a latch reset circuit to reset the latch circuit 250 (such that the latch circuit becomes unlatched) when the magnitude of the switch voltage $V_{SW}$ becomes greater than the predetermined switch voltage threshold $V_{SW-TH}$ (e.g., at time $t_2$ in FIG. 4). Since the latch circuit 250 is no longer latched after the magnitude of the switch voltage $V_{SW}$ has exceeded the predetermined switch voltage threshold $V_{SW-TH}$, the FET Q222 is operable to become conductive to charge the energy storage capacitor C210 once again when the magnitude of the switch voltage $V_{SW}$ drops below the predetermined switch voltage threshold $V_{SW-TH}$ near the end of the half-cycle (e.g., at time $t_3$ in FIG. 4).

The switch voltage monitor circuit 260 comprises a semiconductor switch (e.g., an NPN bipolar junction transistor Q262), which is coupled across the series combination of the first transistor Q252 and the first resistor R254 of the latch circuit 250, i.e., across the latch circuit. A resistive divider (having two resistors R264, R266) is coupled between the diode D212 and the emitter of the transistor Q252 to produce a voltage representative of the magnitude of the switch voltage $V_{SW}$ at the junction of the resistors R264, R266. A zener diode Z268 is coupled between the junction of the two resistors R264, R266 and the base of the transistor Q252, and a resistor R269 is coupled between the base and the emitter of the transistor Q252. For example, the resistors R264, R266, R269 have resistances of 100 kΩ, 18 kΩ, and 100 kΩ, respectively, and the zener diode Z268 has a breakover voltage of 10 V, such that when the magnitude of the switch voltage $V_{SW}$ exceeds approximately 70 V, the zener diode Z268 begins to conduct current, and the transistor Q252 is rendered conductive. Accordingly, the FET Q222 is rendered non-conductive and the latch circuit 250 is reset. When the magnitude of the switch voltage $V_{SW}$ decreases below the predetermined switch voltage threshold $V_{SW-TH}$ (i.e., 70 V), the transistor Q252 is becomes non-conductive and the FET Q222 is operable to become conductive, thus, allowing the capacitor C210 to charge near the end of the half-cycle.

The cat-ear power supply 200 is described herein as being coupled between the neutral terminal and circuit common such that power supply charges during the negative half-cycles. One skilled in the art will easily recognize that the concepts of the present invention could be applied to a cat-ear power supply that charges only during the positive half-cycles or during both the positive and negative half-cycles.

Although the present invention has been described in relation to particular embodiments thereof, many other variations and modifications and other uses will become apparent to those skilled in the art. Therefore, the present invention should not be limited by the specific disclosure herein.

What is claimed is:

1. A cat-ear power supply for a load control device for controlling the amount of power delivered to an electrical load from an AC power source, the power supply operable to generate a DC voltage, the power supply comprising:
   an energy storage capacitor;
   a controllably conductive switching circuit coupled in series electrical connection with the energy storage capacitor for selectively charging the energy storage capacitor to produce the DC voltage, the controllably conductive switching circuit operable to become conductive to charge the energy storage capacitor near the beginning of a half-cycle of the AC power source;
   a latch circuit coupled to the controllably conductive switching circuit, wherein the latch circuit controls the controllably conductive switching circuit to be non-conductive in response to the magnitude of the DC voltage; and
   a switch voltage monitor circuit coupled to the controllably conductive switching circuit and the latch circuit, such that the switch voltage monitor circuit controls the controllably conductive switching circuit to be non-conductive when the magnitude of a switch voltage across the controllably conductive switching circuit exceeds a predetermined switch voltage threshold and also resets the latch circuit when the magnitude of the switch voltage exceeds the predetermined switch voltage threshold;
   wherein the controllably conductive switching circuit is operable to become conductive to charge the energy storage capacitor near the end of the half-cycle when the magnitude of the switch voltage drops below the predetermined switch voltage threshold.

2. The power supply of claim 1, wherein the switch voltage monitor circuit comprises a switch voltage monitor semiconductor switch coupled across the latch circuit, such that the voltage across the latch circuit is controlled to substantially zero volts when the magnitude of the switch voltage exceeds the predetermined switch voltage threshold.

3. The power supply of claim 2, further comprising:
   a voltage regulation circuit coupled to the latch circuit and the energy storage capacitor, and operable to cause the latch circuit to control the controllably conductive switching circuit to become non-conductive when the magnitude of the DC voltage exceeds a predetermined peak voltage threshold.

4. The power supply of claim 3, wherein the latch circuit comprises a first latch semiconductor switch coupled in series electrical connection with a first resistor, the switch voltage monitor semiconductor switch of the switch voltage monitor circuit coupled in parallel with the series combination of the first latch semiconductor switch and the first resistor, the first latch semiconductor switch rendered conductive when the magnitude of the DC voltage exceeds the predetermined peak voltage threshold.

5. The power supply of claim 4, wherein the latch circuit comprises a second latch semiconductor switch coupled in series electrical connection with a second resistor, the series combination of the second latch semiconductor switch and the second resistor coupled in parallel with the series combination of the first latch semiconductor switch and the first resistor, the second latch semiconductor switch rendered conductive in response to the first latch semiconductor switch being rendered conductive.

6. The power supply of claim 5, wherein the first latch semiconductor switch comprises a PNP bipolar junction transistor having a base coupled to the junction of the second latch semiconductor switch and the second resistor, the second latch semiconductor switch comprising an NPN bipolar junction transistor having a base coupled to the junction of the first latch semiconductor switch and the first resistor, the base of the first latch semiconductor switch further coupled to the voltage regulation circuit, such that the voltage across the latch circuit is maintained at a substantially low voltage after the magnitude of the DC voltage exceeds a predetermined peak voltage threshold.

7. The power supply of claim 2, wherein the switch voltage monitor semiconductor switch comprises an NPN bipolar junction transistor, the switch voltage monitor circuit further comprising a zener diode adapted to be coupled between the AC power source and a base of the transistor, such that the transistor is rendered conductive when the voltage across the zener diode exceeds a breakover voltage of the zener diode.

8. The power supply of claim 1, wherein the controllably conductive switching circuit comprises a semiconductor switch.

9. The power supply of claim 8, wherein the semiconductor switch comprises a field-effect transistor.

10. The power supply of claim 1, further comprising:
    a voltage regulation circuit coupled to the latch circuit and the energy storage capacitor, and operable to cause the latch circuit to control the controllably conductive switching circuit to become non-conductive when the magnitude of the DC voltage exceeds a predetermined peak voltage threshold.

11. The power supply of claim 1, wherein the load control device is operable to receive an AC line voltage of the AC power source, and the magnitude of the switch voltage is representative of the magnitude of the AC line voltage.

12. A load control device for controlling an amount of power delivered to an electrical load from an AC power source, the load control device comprising:
    a controllably conductive device adapted to be coupled in series electrical connection between the source and the load, the controllably conductive device having a control input for controlling the controllably conductive device between a non-conductive state and a conductive state;
    a controller operatively coupled to the control input of the controllably conductive device for controlling the semiconductor switch between the non-conductive state and the conductive state;
    a cat-ear power supply for generating a DC voltage, the power supply comprising a controllably conductive switching circuit for selectively charging an energy storage capacitor to produce the DC voltage, the controllably conductive switching circuit operable to be conductive to charge the energy storage capacitor near the beginning of a half-cycle of the AC power source, the power supply further comprising a latch circuit for controlling the controllably conductive switching circuit to be non-conductive in response to the magnitude of the DC voltage, and a switch voltage monitor circuit for controlling the controllably conductive switching circuit to become non-conductive and also resetting the latch circuit when the magnitude of a switch voltage across the controllably conductive switching circuit exceeds a predetermined switch voltage threshold;
    wherein the controllably conductive switching circuit is operable to become conductive to charge the energy storage capacitor near the end of the half-cycle when the magnitude of the switch voltage drops below the predetermined switch voltage threshold.

13. The load control device of claim 12, wherein the controllably conductive device comprises a bidirectional semiconductor switch.

14. The load control device of claim 13, wherein the bidirectional semiconductor switch comprises two FETs in anti-series connection.

15. The load control device of claim 14, wherein the controller is operable to control the FETs using a reverse-phase control dimming technique.

16. The load control device of claim 12, further comprising:
- a neutral terminal coupled to the power supply, the neutral connection adapted to be coupled to the neutral side of the AC power source, such that the power supply is operable to draw current from the AC power source through the neutral terminal.

17. The load control device claim 12, wherein the load control device is operable to receive an AC line voltage of the AC power source, and the magnitude of the switch voltage is representative of the magnitude of the AC line voltage.

18. A power supply for a load control device for controlling the amount of power delivered to an electrical load from an AC power source, the load control device operable to receive an AC line voltage of the AC power source, the power supply operable to generate a DC voltage, the power supply comprising:
- an energy storage capacitor;
- a controllably conductive switching circuit coupled in series electrical connection with the energy storage capacitor for selectively charging the energy storage capacitor to produce the DC voltage, the controllably conductive switching circuit operable to become conductive to charge the energy storage capacitor near the beginning of a half-cycle of the AC power source;
- a latch circuit coupled to the controllably conductive switching circuit, wherein the latch circuit controls the controllably conductive switching circuit to become non-conductive in response to the magnitude of the DC voltage; and
- a switch voltage monitor circuit coupled to the controllably conductive switching circuit, such that the switch voltage monitor circuit maintains the controllably conductive switching circuit non-conductive when the magnitude of the AC line voltage exceeds a predetermined line voltage threshold;

characterized in that the switch voltage monitor circuit is further coupled to the latch circuit such that the latch circuit is reset when the magnitude of the AC line voltage exceeds the predetermined line voltage threshold, and the controllably conductive switching circuit is operable to become conductive to charge the energy storage capacitor near the end of the half-cycle when the magnitude of the AC line voltage drops below the predetermined line voltage threshold.

* * * * *